United States Patent
Leymann et al.

(10) Patent No.: US 6,615,265 B1
(45) Date of Patent: Sep. 2, 2003

(54) ENABLING PLANNED OUTAGES OF APPLICATION SERVERS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/347,342

(22) Filed: Jul. 2, 1999

(30) Foreign Application Priority Data

Aug. 4, 1998 (DE) .......................................... 981 14 597

(51) Int. Cl.[7] .............................................. G06F 15/16
(52) U.S. Cl. ........................................ 709/227; 709/226
(58) Field of Search ................................ 709/226, 227, 709/228, 203, 221, 223, 224, 105, 200; 714/1, 4, 23, 24; 707/202

(56) References Cited

U.S. PATENT DOCUMENTS

| | | | | |
|---|---|---|---|---|
| 4,718,007 A | * | 1/1988 | Yukino ........................ 713/330 |
| 4,868,832 A | * | 9/1989 | Marrington et al. ......... 365/229 |
| 5,341,477 A | * | 8/1994 | Pitkin et al. ................. 709/203 |
| 5,526,492 A | * | 6/1996 | Ishida ......................... 709/208 |
| 5,907,675 A | * | 5/1999 | Aahlad ........................ 709/203 |
| 6,199,110 B1 | * | 3/2001 | Rizvi et al. .................. 709/227 |
| 6,330,690 B1 | * | 12/2001 | Nouri et al. ................. 709/223 |
| 6,397,346 B1 | * | 5/2002 | Cavanaugh et al. ............ 714/4 |

OTHER PUBLICATIONS

Chase Jeffery, "Server Switching: Yesterday and Tommorrow", Jun. 2001, Duke University, pp. 114–123.*

* cited by examiner

Primary Examiner—Dung C. Dinh
Assistant Examiner—Kimberly Flynn
(74) Attorney, Agent, or Firm—A. Bruce Clay; Carstens, Yee & Cahoon LLP

(57) ABSTRACT

A polite manner is used to discontinue availability of an application-server connected to at least one application-client. The connected-application-server determines what if any connected-application-clients have an open connection to the said connected-application-server. The application-server sends the connected-application-client a demand to switch to a substitute-application-server. The connected-application-client then opens a substitute-connection to a substitute-application-server and closes the connection to the connected-application-server. Finally, the connected-application-server discontinues availability of the connected-application-server by terminating the connected-application-server.

19 Claims, 2 Drawing Sheets

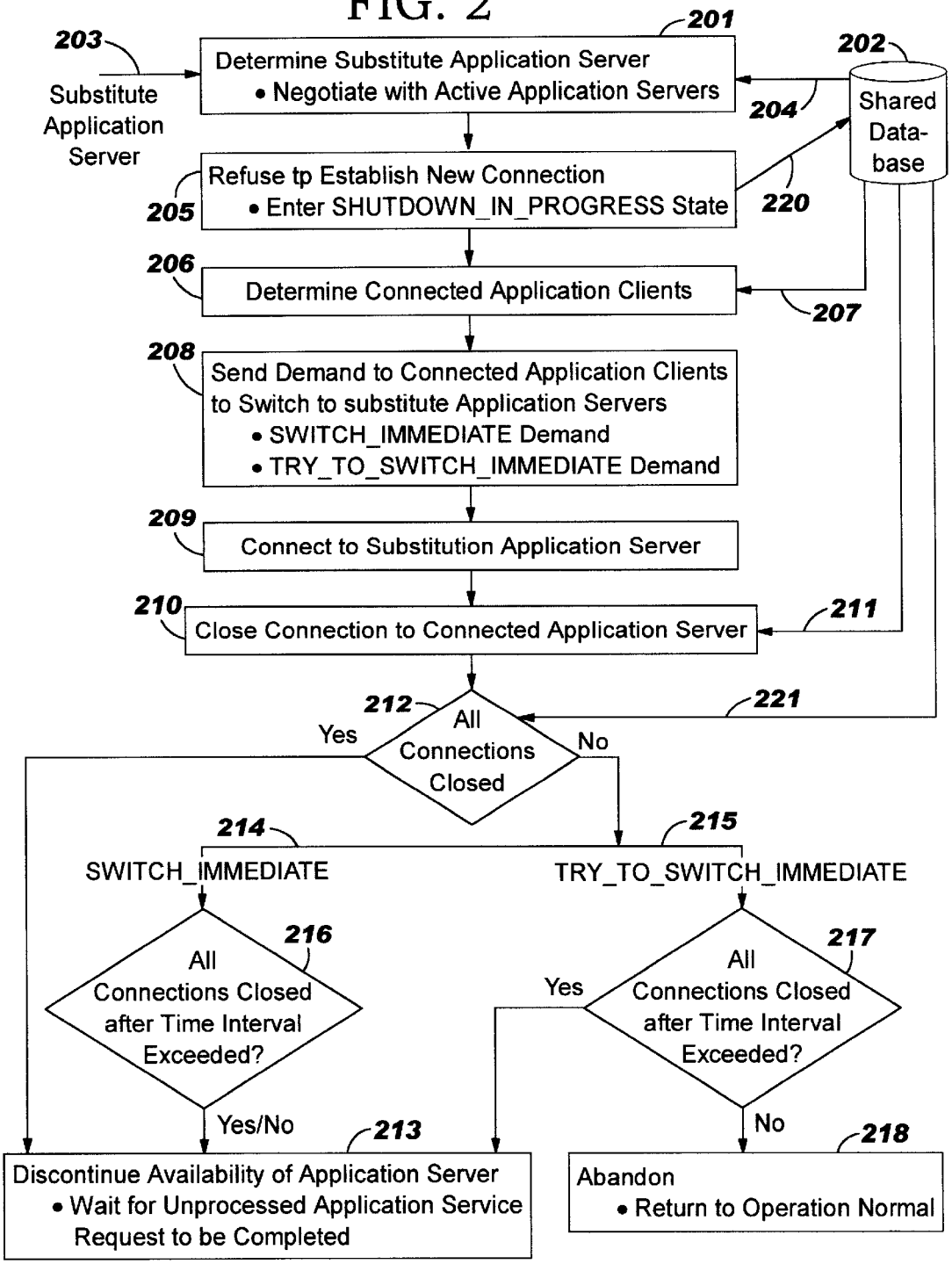

ENABLING PLANNED OUTAGES OF APPLICATION SERVERS

FIELD OF THE INVENTION

The present invention relates to a method of availability management of an application executed by a computer system. More particularly, the invention relates to a method of discontinuing availability of an application-server connected to at least one application-client by taking the application-server out of service in a polite manner.

BACKGROUND OF THE INVENTION

Enterprises depend on the availability of the systems that support their day to day operation. A system is called available if it is up and running and is producing correct results. The availability of a system is the fraction of time it is available. With the advent of distributed systems, techniques have been invented which use two or more address spaces on different machines running the same software to improve availability (often called active replication). Further details on these aspects may be found in S. Mullender, "Distributed Systems", ACM Press, 1993. In using two or more address spaces on the same machine running the same software which gets its request from a shared input queue, the technique of warm backups is generalized by the hot pool technique; refer for instance to F. Leymann and D. Roller, "Building a robust workflow management system with persistent queues and stored procedures", in: Proc. Intl. Conf. on Data Engineering ICDE 98 (Orlando, Fla., Feb. 25–28, 1998).

Despite progress, further improvements are urgently required to support enterprises by increasing the availability of their applications and allowing for electronic business on a 7 (days)*24 (hour) basis; due to the ubiquity of world-wide computer networks, at any point in time, somebody might have interest in accessing a certain application server.

SUMMARY OF THE INVENTION

The invention is based on the objective of increasing the availability of an application executed by a computer system due to a dedicated method of discontinuing availability of an application server.

This objective is solved by claim 1. The method of discontinuing availability of an application-server (110) connected to at least one application-client (101) is executed by an computer system. Said connected-application-server offers execution of application-service-requests to said connected-application-client. Said method comprises a connected-application-client-determination-step (206) executed by said connected-application-server which determines said connected-application-client having an open connection (102) to said connected-application-server. Said method comprises a switch-demand-step (208) executed by said application-server sending said connected-application-client a demand to switch to a substitute-application-server. Said method further comprises a connect-to-substitute-application-server-step (209) executed by said connected-application-client opening a substitute-connection to a substitute-application-server. Moreover said method comprises a close-connection-step (210) executed by said connected-application-client closing said connection to said connected-application-server. Finally said method comprises a termination-step (212–218) executed by said connected-application-server discontinuing availability of said connected-application-server by terminating said connected-application-server.

The current invention is of advantage in the area of systems management, especially in the area of availability management. The invention allows to take application servers out of service in a polite manner. Application clients depending on the availability of application services provided by the application server will be informed that the application server is going to discontinue its application services so that the application clients can switch over to another application server as subsitute application server. As a result, users will not realize any downtime of the overall application services because the whole processing is completely transparent to the user. Therefore these users no longer realize a reduced availability of the requested service, i.e. they do not realize the outage. Affected users no longer have to determine substitute application servers themselves for instance by queries against a directory, or calling a help desk or other administrative personnel. Also affected users do not have to open a communication connection to the substitute application servers themselves.

Additional advantages are accomplished by preceding said method by a refuse-new-connection-step (205) executed by said connected-application-server. Said step prevents another application-client to open a new connection to said connected-application-server.

Based on this feature the current teaching allows that new application clients, in the search of a connection to an application server, will not be able to establish such a connection, which soon afterwards would have to be closed again.

Additional advantages are accomplished by preceding said method by an optional substitute-application-server-determination-step (203) executed by said connected-application-server, which uses a specified-substitute-application-server (203) (specified on invocation of said method of discontinuing) as substitute-application-server (120). Moreover in said switch-demand-step an identification (104) of said specified-substitute-application-server is sent to said connected-application-client. Furthermore in said connect-to-substitute-application-server-step said connected-application-client opens a substitute-connection (103) to said specified-substitute-application-server.

Based on this feature the current teaching allows the specification of which application server is to be used as a substitute application server. Therefore, the application server, as well as the connected application clients, are relieved from the need to determine any substitute application server. This results in performance gains. Moreover, this gives the administrator or the program dedicated control on defining the specific substitute application server to be used.

Additional advantages are accomplished if said method is preceded by an optional substitute-application-server-determination-step (203) executed by said connected-application-server, which determines a collection of substitute-application-servers comprising one or more substitute-application-servers. Moreover according the current teaching in said switch-demand-step identifications (104) of said collection of substitute-application-servers are sent to said connected-application-client. Finally in response to said demand in said connect-to-substitute-application-server-step said connected-application-client selects a substitute-application-server (120) from said collection of substitute-application-servers and opens a substitute-connection (104) to said selected substitute-application-server.

Based on this feature of the current teaching the application clients are relieved from determining the substitute application servers themselves. The application server which is going to discontinue its application services is doing that once for all affected application clients increasing overall efficiency.

Additional advantages are accomplished if said substitute-application-server-determination-step determines said collection of substitute-application-servers by retrieving (204) from a first database (202, 130) a collection of currently active application-servers (110, 120, 140). In addition the application server is optionally negotiating with said currently active application-servers whether it may discontinue its availability. Finally, if discontinuing availability is confirmed, the application server selects one or more of said currently active application-servers as said collection of substitute-application-servers.

By maintaining the list of active application servers in database it becomes very performance-effective to determine these active application servers: it is reduced to a database access. From this list a further subset can be determined according any criteria; for instance proximity between the (substitute) application servers and/or application clients, nature of the application services etc. may be of importance.

By negotiating between the application server to be discontinued and the other active application servers various policies can be implemented to decide if the application server really may discontinue its application services. For instance it may depend on the availability of an substitute application server with the same service spectrum, or with a certain performance characteristic etc.

Additional advantages are accomplished by sharing said first database between all currently active application-servers.

In this case the database reflects the global view on the activity status of all application servers. Moreover every application server is able to determine the list of currently active application servers itself.

Additional advantages are accomplished if in said refuse-new-connection-step said connected-application-server is moved into a SHUTDOWN_IN_PROGRESS-state. Moreover it is suggested to store (220) said SHUTDOWN_IN_PROGRESS-state into said first database.

An indication that a certain application server is in the SHUTDOWN_IN_PROGRESS-state may be of importance for other application servers; for instance, an application server in the SHUTDOWN_IN_PROGRESS-state can automatically be excluded as a potential substitute application server.

Additional advantages are accomplished if said switch-demand-step (208) comprises sending a SWITCH_IMMEDIATE demand irreversibly enforcing to switch to said substitute-application-server. As an alternative said switch-demand-step (208) comprises sending a TRY_TO_SWITCH_IMMEDIATE demand discontinuing said connected-application-server only, if said connected-application-client is able to connect to said subsitute-application-server.

Much flexibility is introduced by distinguishing whether an application server is discontinuing its application services unconditionally or only if the application clients were able to connect to a substitute application server. In the later case, application availability is especially increased significantly.

Additional advantages are accomplished if said close-connection-step is preceded by indicating to said connected-application-server to record (211) said connection as closed in a second database.

By recording the open/close status of connections to application clients in a database allows for a performance-effective overview on the connection status of an application server.

Additional advantages are accomplished if said termination-step comprising a determination-sub-step (212, 216, 217), which determines if all connections to said connected-application-server have been closed. Furthermore said termination-step comprises a shutting-down-substep (213), which terminates said connected-application-server only, if all connections to said connected-application-server have been closed.

Such a behavior of the current methodology maximizes availability of an application to application clients. Applications clients are services until they have been able to connect to a substitute application server. Moreover, users will not even realize that the application client has connected to a substitute application server.

Additional advantages are accomplished if said determination-sub-step is determinating, if all connections to said connected-application-server have been closed, by periodically checking the number of open connections by inspecting (221) said second database.

A simple database access for determining the connection status of all application clients delivers this information in a very efficient manner. Moreover, a common interface for this information is established for other components.

Additional advantages are accomplished if said determination-sub-step (216) is closing all open connections, if a first time interval has been exceeded and not all open connections have been closed and if a SWITCH_IMMEDIATE demand has been sent during said switch-demand-step.

Based on this approach even in the case that the application server is to be discontinued unconditionally but not all connections could be closed the current teaching increases availability by forcing the discontinuation not before a certain time interval has elapsed.

Additional advantages are accomplished if said determination-sub-step (217, 218) is abandoning said method of discontinuing and putting said connected-application-server in normal operation again, if a second time interval has been exceeded and said connected-application-client has not been able to connect to said substitute-application-server, and if said TRY_TO_SWITCH_IMMEDIATE demand has been sent to said connected-application-client.

This variant of the proposed methodology offers the most polite approach and delivers the maximum of availability to application clients. In the extrem case that the application client has not been able to connect to a substitute application server availability of the current application server is pre-serversed by abandoning the current method.

Additional advantages are accomplished if said determination-sub-step, instead of abandoning, is repeating said sending of said TRY_TO_SWITCH_IMMEDIATE demand to said connected-application-client. Said method of discontinuing is abandoned and said connected-application-server is put in normal operation again not before said TRY_TO_SWITCH_IMMEDIATE demand has been repeated M times.

Through this approach the actual abandonment is further postponed allowing for an improved trade-off of the requirement to discontinue the application server on one hand and to make application services available to application clients, which so far have not been able to connect to a substitute application server.

Additional advantages are accomplished if said shutting-down-sub-step is preceded by determining, if still unprocessed applications-service-request are stored in said connected-application-server, and executing said shutting-down-sub-step only, if no unprocessed application-service-requests are stored anymore.

This behavior guarantees that application service requests, once sent to the application server, will be processed even if that application server is going to discontinue its availability. Therefore, the application client suffers no performance degradations by resending already submitted application service requests to a substitute application server.

Additional advantages are accomplished if shutting-down-sub-step is executed after a third time interval has been exceeded ignoring unprocessed application-service-requests.

Through this feature, the application server can finally discontinue its availability if all attempts to cause an application client to connect to a substitute application server failed.

Additional advantages are accomplished if the application servers each comprise a hot pool of one or a multitude of application instances, being executed in the same or a multitude of address-spaces, sharing an input queue. Additionally, said application servers might be executed on the same and/or a cluster of computer systems. Furthermore said application client and said application servers might be executed on the same and/or different computer systems.

By virtue of this teaching the complete spectrum of hardware and software based redundancy approaches are made available for exploitation. The current teaching does not impose any restrictions on an implementation of the current teaching like the number of application instance, the number and location of application servers or number of address-spaces the application instances are executed in.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 is a summarizing overview on the proposed method in the form of a flow diagram.

DETAILED DESCRIPTION OF THE INVENTION

Figure 1:
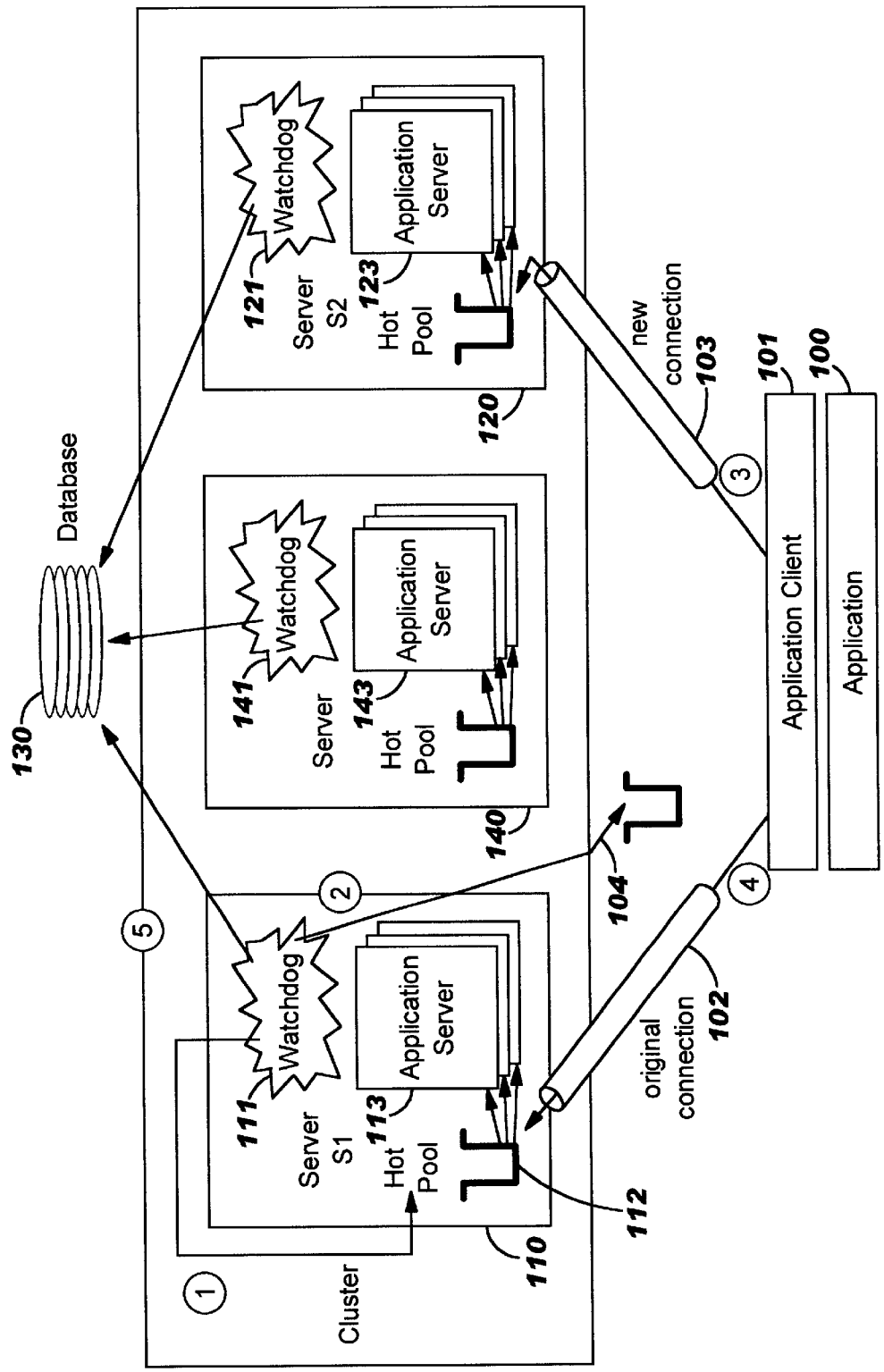
FIG. 1 is a diagram reflecting the current invention by visualizing the basic protocol for initiating a planned outage between application servers and application clients initiated by an application server.

If the current specification is referring to an application it may be on any nature not limited to any specific type or implementation. The terms application client and application server have to be understood from a logical point of view only relating to some type of "instance". These terms do not necessarily distinguish different address space or even different computer systems.

The current invention assumes a certain communication path between application client and application server; this does not mean that the invention is limited to a certain communication paradigm.

Also if the current specification is referring to a "database" the term is to be understood in a wide sense comprising not only actual databases (like relational, hierarchical, databases etc.) but also simple files and the like.

Moreover if the current invention is suggesting the hot pool technique (which will be explained below) any other redundancy technology may be exploited instead without deviating from the gist of the current invention.

Enterprises depend on the availability of the systems supporting their day-to-day operation. A system is called available if it is up and running and is producing correct results. The availability of a system is the fraction of time it is available.

With the advent of distributed systems, techniques have been invented which use two or more address spaces on different machines running the same software to improve availability (often called active replication). In using two or more address spaces on the same machine running the same software, which gets its request from a shared input queue, the technique of warm backups is generalized by the hot pool technique; a client sends a request to the input queue of one hot pool.

To further improve scalability and availability, multiple hot pools running the same software are hosted on different machines building clusters. Each client establishes a connection to a particular hot pool and sends application service requests to the input queue of this hot pool. By assigning clients to different hot pools scalability is achieved.

An application server is an executable implementing a collection of related services. A hot pool is a collection of address spaces each of which runs the same application server(s) and each of these application servers receive requests from an input queue which is shared between the hot pool members. A hot pool is managed by a service called watchdog which is responsible for tasks like starting up and shutting down the hot pool, checking the liveliness of the members within a hot pool etc. By a server the current invention assumes a certain physical machine which hosts a hot pool of application servers. A cluster is a collection of servers which fail independently, and each server hosts a hot pool of application servers of the same kind.

Applications request services from application servers via application clients. An application client is an executable which runs on the same machine as the application and which communicates with a server on behalf of the application. If the communication between the application client and a server is based on (asynchronous) reliable message exchange, the application server is said to be message based. In what follows, the invention assumes a message based communication between application clients and application servers. Consequently, an application client requests the performance of a certain service by sending a corresponding message into the input queue of a hot pool of associated application servers on a particular machine. Focussing the current specification on message based communication systems does not limit applicability of the current teaching to other communication paradigms like remote procedure calls or other models.

When maintenance tasks are required (e.g. software release upgrades, exchange of failed hardware components, configuration modifications requiring shutdown etc.) an affected hot pool or even the whole hosting server must be shut down. In this case, users attached to this hot pool or server typically get an error message at least when sending a request message to the hot pool or server, respectively.

Thus, these users realize a reduced availability of the requested service, i.e. they realize the outage. An affected user typically has to locate a hot pool or server still servicing his requests; this often requires queries against a directory, or calling a help desk or other administrative personnel, for example. Once the available service is located, the user must logon to it; often, different passwords or even userids have to be provided when this is not managed consistency. All-in-all reacting to outages is annoying for the affected users.

The current invention suggests to take hot pools out of service in a polite manner; i.e. clients depending on the availability of the services provided by the hot pool will be informed so that they can switch over to another hot pool. As a result, users will not realize any downtime of the overall application services and in addition overall availability of application services will be increased.

FIG. 1 depicts an application which requests services via an application client (101) from application servers (113). The depicted application client is connected to a hot pool on server S1 (110). Moreover FIG. 1 reflects additional application servers (120), (140) redundantly executing the same applications on application servers (123), (143) providing application services to the application (100) executing on application client (101). It is assumed that the hot pool on server S1 must be shut down in order to be able to perform some maintenance task. Then the following method will make sure that the hot pool can be shut down without having the application (100) noting this.

The following numbering refers to the step numbers visualized in FIG. 1. Not all step numbers are reflected in FIG. 1.

Step 0: As the initial step, it is made sure that at least one hot pool will still be available for servicing requests after the hot pool on S1 is shut down (this is not shown in FIG. 1). This initial step is needed to achieve the goal that the application does not note the planned outage.

A specific incarnation of an algorithm of how to achieve this is not the primary focus of the current invention. Thus, only two of many different possible ways to ensure this are sketched. For example:

a. The simplest way is to assume that the entity (e.g. an administrator) submitting the shut down request is responsible for ensuring this.

b. As an alternative, when the shut down request comes in, the watchdog (111) on S1 determines all currently available hot pools on all servers. Again, how this is done is not the primary subject of the current invention, but to give an idea: often a database (130) shared by all watchdogs (111, 141, 121) is provided and can be accessed, and this database holds the actual state of all hot pools of the cluster. Next, the watchdog (111) negotiates with the watchdogs (121, 141) of all available servers (120, 140) whether or not it may shut down or not. As before, various negotiation protocols are possible here, reaching from quorum based protocols to protocols based on persistent counters in the shared database for the number of available hot pools and hot pools actually performing shut down. No further details on these protocols are provided because the actual protocol chosen is not fundamental for the present current invention and many approaches are known in the state of the art.

Step 1: When the watchdog negotiated permission to shut down the hot pool, it will also make sure that no new connections can be established by any application client to this hot pool.

Again different mechanisms are possible to realize this: For example, in case a database (130) with state information exists and is shared between all watchdogs and hot pool members, the state of the subject hot pool can be set to "shut down in progress" which results in refusing new connections to this hot pool.

Step 2: The watchdog will determine all application clients that have an open connection with the hot pool that are to be shut down. Again, different mechanisms exist for how this can be done, for example, these application clients may be registered in a database (130), or simply cached on the server S1.

The watchdog (111) will send a message (104) to each of the determined application clients (101) indicating that they have to switch immediately to another hot pool. As an optimization option, this SWITCH_IMMEDIATE message (104) could contain all currently available hot pools providing the same services. Thus information can be used in the next step.

Step 3: In response to the SWITCH_IMMEDIATE message (104), each receiving application client will select an available hot pool and will log on to it (103). From this time on, all new request messages created by that application client will be sent via the new connection (103).

A list of available hot pools providing the same services could be read by the client in processing the message, or it could be provided with the message itself (as indicated above in step (2)). The detail of how to get this list is not the primary subject of the present invention.

Step 4: When the application client established its new connection it will close (all of) its existing connection(s) (102) with the hot pool awaiting shut down.

A possible implementation of the current invention could realize closing a session by sending a corresponding message to the hot pool to be shut down. Processing such a message could result in changing the information about the application client stated in the shared database (130) indicating that no connection for this client exists to this hot pool.

Step 5: When all connections to the hot pool awaiting shut down are closed, the watchdog (111) will shut down the hot pool.

A possible implementation of the current invention could detect that all connections are closed by periodically counting the number of open connections to the hot pool as tracked in the shared database (130).

An option of the shut down request may specify that all requests already submitted to the hot pool should be processed before the shut down is performed. In this case, the watchdog has to determine whether there are still requests in the server input queue (112) when all connections are closed. When no requests are pending the shut down can be performed.

Step 6: In order to avoid blocking in shut down processing and to deal with erroneous situations, time out processing is performed by the watchdog (not shown in FIG. 1):

a. A maximum time interval for waiting for closing all open connections can be specified. If this time is exceeded, the watchdog performs the shut down. The time could be exceeded because one of the connected application clients has stopped, or it failed in connecting to another available hot pool, for example. Note, that the usual problems with time out processing apply: If the time out interval is chosen too small, an application client may be connected to no hot pool at all; as a result, the application will note the outage.

b. A maximum time interval for waiting for processing outstanding requests before shut down can be specified.

If the time is exceeded, the watchdog forces the shut down. The time could be exceeded because the messages currently processed represent very time consuming work, for example. If the time interval chosen is too small, some of the outstanding requests may remain in the server input queue without being processed until the hot pool is started again (persistent messages with message integrity ensuring application servers assumed). As a result, the application may note the outage because it may not get a response to some of its requests.

The situation of step (6)(a) can be improved by modifying the method of the current invention as follows:

Instead of sending a SWITCH_IMMEDIATE message in step (2) which forces the application client (101) to switch, a TRY_TO_SWITCH_IMMEDIATE message can be introduced which politely asks the application client to switch to another hot pool. If an application client cannot switch, the hot pool will not be shut down; for this purpose, no time out processing as described in (6)(a) need be performed. In sending the TRY_TO_SWITCH_IMMEDIATE message to all clients still connected to the hot pool awaiting shut down once the time is exceeded this time out behavior can be changed; a maximum number of retries to shut down could be specified before the watchdog (111) recreates the normal state for the hot pool indicating that the shut down could not be performed.

With the latter modifications the current invention basically describes two variants of shut down protocols, one polite shut down protocol, which always ensures that a hot pool is shut down, and a vote shut down protocol, which keeps a hot pool up and running in case an application client cannot connect to another hot pool.

FIG. 2 reflects a review of the proposed methodology. FIG. 2 is a combination of essential and non-essential features of the current invention.

Within step (201) the proposed method determines the substitute application server(s). As one possibility, the substitute application servers(s) could be specified with invocation of the method (203) or as another possibility a (shared) database (202) could be inspected (204) storing currently active application servers. Optionally, the application server negotiates with the currently active application servers whether it may discontinue availability.

Other application-clients are prevented from opening a new connection to the connected application server by step (205) by refusing new connections to the connected application server. The connected application server is moved into a SHUTDOWN_IN_PROGRESS state, which may be stored (220) into the database (202).

Within step (206) the connected application client(s) having an open connection to the connected application server are determined. The identification of the connected application clients might be retrieved (207) from a database (202).

To the connected application clients, a demand to switch to a substitute application server is sent in step (208). The demand may be of SWITCH_IMMEDIATE or TRY_TO_SWITCH_IMMEDIATE nature. Depending on the nature of the demand, the application server will or will not discontinue its services unconditionally.

The connected-application-client will open a substitute connection to a substitute application server in step (209).

In step (210) the connected application client will, if it was successful in connecting to a substitute application server, close the connection to the application server. Optionally it will be indicated (211) by a record entry in the database (202) that the connection between the connected application server and the application client is closed.

Within step (212) it will be checked whether or not all connections of the application server have been closed. If this is the case, availability of the application server may be discontinued in step (213). Optionally the application server checks its input queue for further unprocessed application service requests and waits with discontinuation of its availability until all application service requests have been completed.

If all connections of the application server have not been closed, subsequent processing depends on whether the connected application client has received a TRY_TO_SWITCH_IMMEDIATE demand (215) or a SWITCH_IMMEDIATE demand (214).

In case a SWITCH_IMMEDIATE demand (214) has been sent to the application client, it is checked in step (216) if a first time interval has been exceeded and all open connections have not been closed. Even if open connections still exist, the availability of the application server is discontinued unconditionally within step (213) after the first time interval has been exceeded.

In case a TRY_TO_SWITCH_IMMEDIATE demand (215) has been sent to the application client, it is checked in step (217), if a second time interval has been exceeded and all open connections have not been closed. If open connections still exist after the second time interval has been exceeded, the proposed methodology is abandoned within step (218) and the application server is put back into normal operation again.

The current invention allows servers to shut down for planned outages in a clustered application server environment without having attached clients note the outage. The availability of the corresponding services is thus increased. Therefore, support for enterprises in increasing the availability of their applications and for allowing for electronic business on a 7 (days)*24 (hour) basis is improved.

With a widespread exploitation of the redundancy paradigm of clustered application servers, the need for support of planned outages will increase which do allow the shut down of selective servers without having applications note the outage, i.e. without realizing availability reduction.

Although the present invention has been described with respect to specific preferred embodiments thereof, various changes and modifications may be suggested to one skilled in the art; and it is intended that the present invention encompass such changes and modifications as fall within the scope of the appended claims.

What we claim is:

1. A method of discontinuing availability of an application-server connected to at least one application-client, the method of discontinuing being executed by a computer system and the connected-application-server offering execution of application-service-requests to the connected-application-client, the method comprising the steps of:

determining with a connected-application-server a connected-application-client with an open connection to said connected-application-server;

said connected-application server determining a collection of substitute-application-servers comprising one or more substitute-application-servers;

sending from said application-server to said connected-application-client a demand to switch to a substitute-application-server;

sending identifications of said collection of substitute-application-servers to said connected-application-client;

said connected-application-client selecting a substitute-application-server from said collection of substitute-application-servers;

said connected-application-client opening a substitute-connection to said selected substitute-application-server;

said connected-application-client closing said connection to said connected-application-server; and said connected-application-server discontinuing availability of said connected-application-server by terminating said connected-application-server.

2. The method of discontinuing availability of an application-server according to claim 1, further comprising the step of said connected-application-server preventing another application-client from opening a new connection to said connected-application-server.

3. The method of discontinuing availability of an application-server according to claim 1, wherein determining a collection of substitute-application-servers comprises the steps of:

retrieving from a first database a collection of currently active application-servers;

optionally negotiating with said currently active application-servers whether said connected-application-server may discontinue availability; and if discontinuing availability is confirmed, selecting one or more of said currently active application-servers as said collection of substitute-application-servers.

4. The method of discontinuing availability of an application-server according to claim 3, wherein said first database is shared by all currently active application-servers.

5. The method of discontinuing availability of an application-server according to claim 3, wherein said connected-application-server is moved into a SHUTDOWN_IN_PROGRESS-state.

6. The method of discontinuing availability of an application-server according to claim 5, wherein said SHUTDOWN_IN_PROGRESS-state is stored into said first database.

7. The method of discontinuing availability of an application-server according to claim 1, wherein the demand comprises one of a SWITCH_IMMEDIATE demand, wherein the SWITCH_IMMEDIATE demand enforces a switch to said selected substitute-application-server, and a TRY_TO_SWITCH_IMMEDIATE demand, wherein connected-application-server is discontinued only if said connected-application-client is able to connect to said selected substitute-application-server.

8. The method of discontinuing availability of an application-server according to claim 1, further comprising indicating to said connected-application-server to record said connection as closed in a second database in response to said connected-application-client closing said connection.

9. The method of discontinuing availability of an application-server according to claim 8, further comprising:

determining if all connections to said connected-application-server have been closed; and terminating said connected-application-server only if all connections to said connected-application-server have been closed.

10. The method of discontinuing availability of an application-server according to claim 9, further comprising:

determining if all connections to said connected-application-server have been closed by periodically checking the number of open connections by inspecting said second database.

11. The method of discontinuing availability of an application-server according to claim 1, wherein said connected-application-server comprises a hot pool of one or more application-instances executed in one or more address-spaces.

12. The method of discontinuing availability of an application-server according to claim 1, wherein said method is executed within said application-servers by a watch-dog.

13. A method of discontinuing availability of an application-server connected to at least one application-client, the method of discontinuing being executed by a computer system and the connected-application-server offering executing of application-service-requests to the connected-application-client, the method comprising the steps of:

determining with a connected-application-server a connected-application-client with an open connection to said connected-application-server;

sending from said application-server to said connected-application-client a demand to switch to a substitute-application-server;

said connected-application-client opening a substitute-connection to a substitute-application-server;

said connected-application-client closing said connection to said connected-application-server;

said connected-application-server discontinuing availability of said connected-application-server by terminating said connected-application-server; and closing all open connections to said connected-application-server if a first time interval has been exceeded and all open connections have not been closed.

14. A method of discontinuing availability of an application-server connected to at least one application-client, the method of discontinuing being executed by a computer system and the connected-application-server offering execution of application-service-requests to the connected-application-client, the method comprising the steps of:

determining with a connected-application-server a connected-application-client with an open connection to said connected-application-server;

sending from said application-server to said connected-application-client a demand to switch to a substitute-application-server;

said connected-application-client attempting to open a substitute-connection to a substitute-application-server;

said connected-application-client closing said connection to said connected-application-server if the connected-application-client successfully opens a substitute-connection to the substitute-application-server;

said connected-application-server discontinuing availability of said connected-application-server by terminating said connected-application-server if the connected-application-client successfully opens a substitute-connection to the substitute-application-server; and further comprising abandoning said method of discontinuing and putting said connected-application-server in normal operation again if a second time interval has been exceeded and said connected-application-client is not able to connect to said substitute-application-server.

15. A method of discontinuing availability of an application-server connected to at least one application-client, the method of discontinuing being executing by a computer system and the connected-application-server offering execution of application-service-requests to the connected-application-client, the method comprising the steps of:

- determining with a connected-application-server a connected-application-client with an open connection to said connected-application-server;
- sending from said application-server to said connected-application-client a demand to switch to a substitute-application-server;
- said connected-application-client opening a substitute-connection to a substitute-application-server;
- said connected-application-client closing said connection to said connected-application-server;
- said connected-application-server discontinuing availability of said connected-application-server by terminating said connected-application-server; and
- repeating said sending of said demand to said connected-application-client, and, if said demand has been repeated a predetermined number of times, abandoning said method of discontinuing and putting said connected-application-server in normal operation again.

16. The method of discontinuing availability of an application-server according to claim 1, further comprising:

- determining if any unprocessed application-service-requests are stored in said connected-application-server; and
- shutting down said application server if no unprocessed application-service-requests are stored in said connected-application-server.

17. The method of discontinuing availability of an application-server according to claim 14, wherein said step of shutting down is executed after a third time interval has been exceeded ignoring unprocessed application-service-requests.

18. A system for discontinuing availability of an application-server connected to at least one application-client, the system for discontinuing being executed on a computer system and the connected-application-server offering executing of application-service-requests to said connected-application-client, the system comprising:

- means for determining with a connected-application-server a connected-application-client with an open connection to said connected-application-server;
- means for said connected-application server determining a collection of substitute-application-servers comprising one or more substitute-application-servers;
- means for sending from said application-server to said connected-application-client a demand to switch to a substitute-application-server;
- means for sending identifications of said collection of substitute-application-servers to said connected-application-client;
- means for said connected-application-client selecting a substitute-application-server from said collection of substitute-application-servers;
- means for said connected-application-client opening a substitute-connection to said selected substitute-application-server;
- means for said connected-application-client closing said connection to said connected-application-server; and
- means for said connected-application-server discontinuing availability of said connected-application-server by terminating said connected-application-server.

19. A computer program product recorded on computer readable media for discontinuing availability of an application-server connected to at least one application-client, the program product for discontinuing being executed by a computer system and the connected-application-server offering executing of application-service-requests to said connected-application-client, the program product comprising:

- computer readable means for determining with a connected-application-server a connected-application-client with an open connection to said connected-application-server;
- computer readable means for said connection-application server determining a collection of substitute-application-servers comprising one or more substitute-application-servers;
- computer readable means for sending from said application-server to said connected-application-client a demand to switch to a substitute-application-server;
- computer readable means for sending identifications of said collection of substitute-application-servers to said connected-application-client;
- computer readable means for said connected-application-client selecting a substitute-application-server from said collection of substitute-application-servers;
- computer readable means for said connected-application-client opening said selected substitute-connection to a substitute-application-server;
- computer readable means for said connected-application-client closing said connection to said connected-application-server; and
- computer readable means for said connected-application-server discontinuing availability of said connected-application-server by terminating said connected-application-server.

* * * * *